United States Patent [19]

Wilson

[11] 4,415,997

[45] Nov. 15, 1983

[54] METHOD FOR DETERMINING SOURCE AND RECEIVER STATICS IN MARINE SEISMIC EXPLORATION

[75] Inventor: Jack L. Wilson, Slidell, La.

[73] Assignee: Mobil Oil Corporation, New York, N.Y.

[21] Appl. No.: 320,286

[22] Filed: Nov. 12, 1981

[51] Int. Cl.³ .......................... G01V 1/38; G01V 1/28
[52] U.S. Cl. ....................... 367/15; 367/36; 367/54
[58] Field of Search ................ 367/15, 36, 21, 54, 367/56

[56] References Cited

U.S. PATENT DOCUMENTS 4,069,471  1/1978  Silverman ........................ 367/54
4,079,353  3/1978  Jenkinson ........................ 367/15
4,101,867  7/1978  Martin ............................ 367/36

FOREIGN PATENT DOCUMENTS 2055202  2/1981  United Kingdom ................ 367/56

Primary Examiner—Nelson Moskowitz
Attorney, Agent, or Firm—Alexander J. McKillop; James F. Powers, Jr.; George W. Hager, Jr.

[57] ABSTRACT

A method of determining source and receiver statics in a marine seismic exploration area overlying a near surface low velocity layer employing a seismic marine energy source, an on-bottom seismic detector cable for measuring seismic reflection signals, and an on-bottom remote seismic monitor for measuring seismic refraction signals.

3 Claims, 2 Drawing Figures

METHOD FOR DETERMINING SOURCE AND RECEIVER STATICS IN MARINE SEISMIC EXPLORATION

BACKGROUND OF THE INVENTION

This invention relates to marine seismic exploration and more particularly to a method for determining source and receiver statics.

A major problem in seismic exploration has been the estimation of time delays under source and receiver positions due to weathering, elevation, and shallow velocity changes. These time delays are often lumped together and simply called "static errors", and the corrections necessary to correct seismic traces for this error are called "static corrections" or "statics".

The widespread use of multiple coverage seismic profiling and the stacking of the multifold common depth point data as described in "Common Reflection Point Horizontal Data Stacking Techniques" by W. Harry Mayne, "Geophysics", Vol. XXVII, No. 6, Part 2 (Dec., 1961), pp. 927-938, requires the elimination of these static errors. Several methods are known for determining these static errors, one of which is described in "The Application and Limitations of Automatic Residual Static Correction Techniques" by B. M. Irving and J. K. Worley, presented at the 39th Annual International Meeting of the Society of Exploration Geophysicists in Calgary, Alberta, Canada. Such method, as well as others, provides a means of resolving the static estimates into source statics and receiver statics. It is these two components, source statics and receiver statics, which are utilized to correct the seismic data prior to common depth point stacking.

Some marine exploration areas are characterized by severe statics problems caused by the existence of a variety of subaqueous features and other sea floor irregularities. Such anomalies generally lie immediately below the water bottom and contain sediments having abnormally low velocities relative to normal sediments at shallow depths. They characteristically resemble channels ranging in depth up to a few hundred feet and lateral extent from a few hundred feet to thousands of feet. Velocities in these sediments are commonly less than half that of normal sediments. This decrease in velocity is due to gas bubbles in the sediment, causing a time delay in seismic energy waves traveling through such sediment relative to seismic energy waves traveling the same distance through normal sediments. One such marine exploration area is near the modern Mississippi River delta.

SUMMARY OF THE INVENTION

The present invention is directed to a method for determining source and receiver statics at a marine exploration site having laterally varying low velocity layers below the water bottom.

A seismic detector cable is deployed along a seismic exploration line for which seismic reflection signals traveling to such detector cable pass through the near surface low velocity layer. At least one seismic monitor is deployed at a distance remote from the detector cable such that the first energy received at the monitor consists of seismic refraction signals which have passed through the near surface low velocity layer.

A first seismic energy wave is generated at an offset distance from the detector cable so as to produce a first seismic signal which travels downward into the earth, is refracted through the earth, and travels upward through the near surface, low velocity layer to intersect the seismic detector cable in a generally orthogonal direction, whereby the first seismic signal, as received by the detector cable, includes a receiver statics component attributable to the near surface low velocity layer.

The first seismic signal is compared to recorded refraction data from non-low velocity layer areas to determine the receiver statics for the selected explorations site.

A second seismic energy wave is generated so as to produce a second seismic signal which travels downward through the near surface low velocity layer into the earth, is refracted through the earth, and is detected by the remote seismic monitor, whereby the second seismic signal, as received by the remote monitor, includes a source statics component attributable to the near surface low velocity layer.

The second seismic energy wave is further received by the detector cable as such wave is reflected from the earth. This reflected second seismic signal is compared to the refracted second seismic signal received by the remote monitor to determine the source statics for the selected exploration site.

DESCRIPTION OF THE PREFERRED EMBODIMENT

In marine exploration, seismic energy is generated in the water and reflections of such energy from subsurface formations are detected by a seismic cable of detectors or hydrophones. At the exploration site, the exploration operation may be carried out with the seismic detector cable fixed in position on the water bottom. Reflection signals received by the hydrophones along the detector cable are transferred to the marine vessel through the cable wiring for recording and processing. If the detector overlies an anomalous layer of low velocity sediments, an undesirable receiver statics effect will be imposed on the seismic reflection signals. Also, if the seismic energy source is energized over such a low velocity sediment, undesirable source statics will be recorded in the seismic reflection signals.

Figure 1:
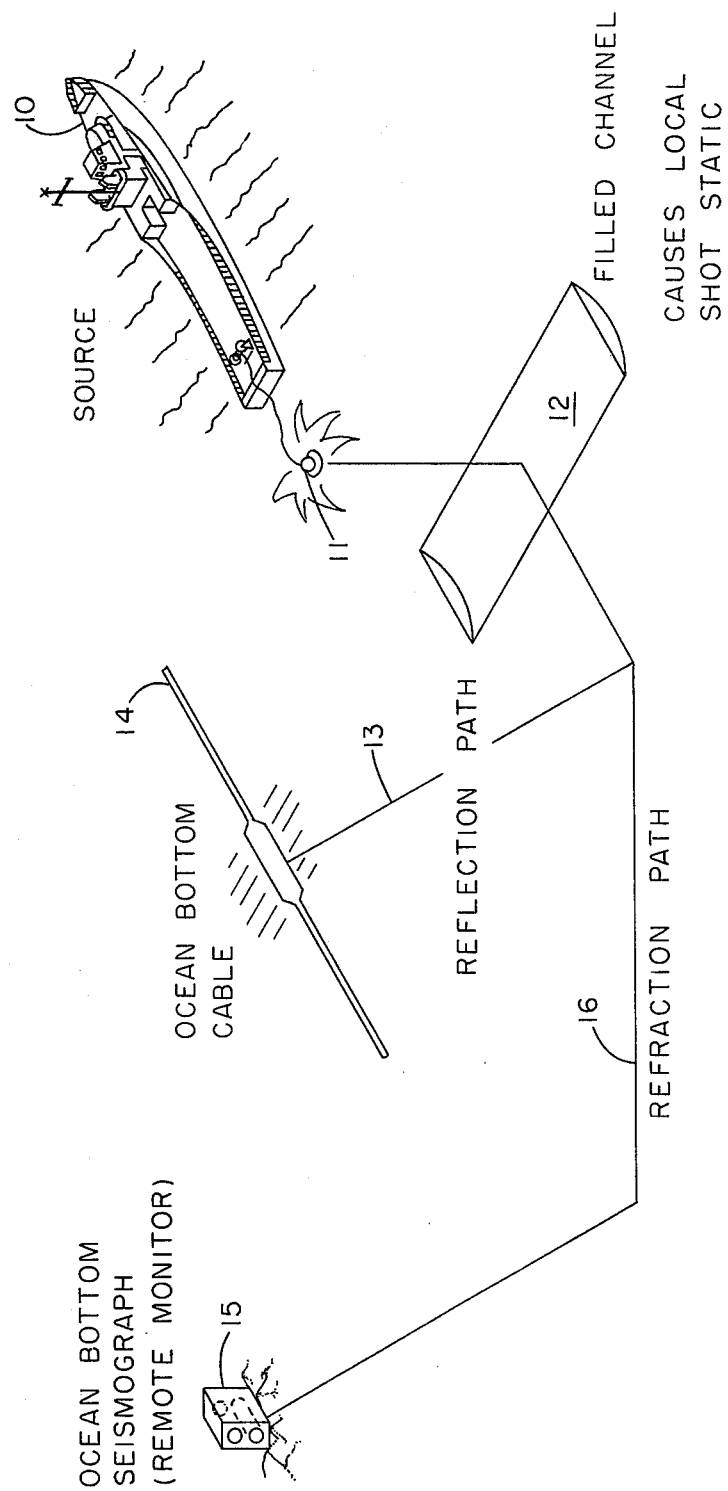
FIG. 1 is a pictorial representation of the method of the present invention for determining source statics over a marine seismic exploration area.
Figure 2:
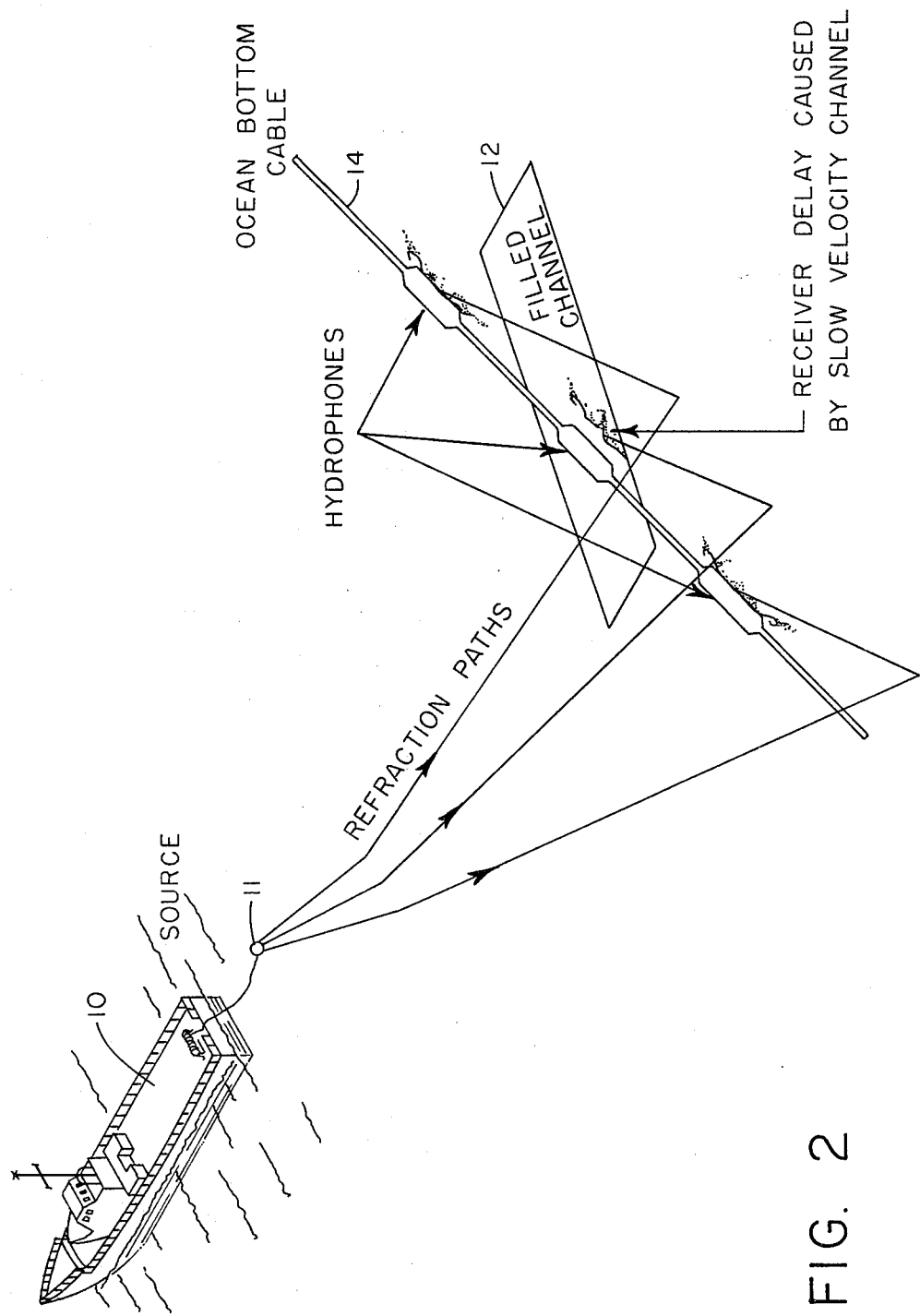
FIG. 2 is a pictorial representation of the method of the present invention for determining receiver statics over a marine seismic exploration area.

In accordance with the present invention, such source and receiver statics are identified for the particular exploration site selected by the methods illustrated in FIGS. 1 and 2 respectively.

Referring to FIG. 1, the marine vessel deploys the seismic energy source 11. Seismic energy waves from such source travel downward through the water and pass into the subsurface formation through the low velocity sediment in the buried channel 12. Reflections of the seismic energy from the subsurface formations travel upward by way of path 13 and are received by the on-bottom seismic detector cable 14. To identify the extent to which source statics is introduced into the seismic reflection signals received and recorded by the detector cable 14, there is provided at least one remote seismic monitor 15. After passing through the channel 12 into the subsurface formations, the seismic energy waves are also refracted along the path 16 and received and recorded by the remote monitor 15 simultaneously with the recording of the seismic reflection signals by the detector cable 14. With a source-to-detector cable offset of 0-4000 feet, for example, a suitable source-to-remote monitor offset will be in the order of 15,000-25,000 feet. The recorded refraction data may then be compared with the recorded reflection data to determine the low velocity layer statics for each source location during the exploration operation.

Referring now to FIG. 2, there is shown the method by which receiver statics, introduced into the detector cable 14 may be determined. In FIG. 2, the detector cable is deployed on the ocean bottom such that seismic reflection signals will pass upward through the low velocity sediment of the channel 12 and be recorded by the hydrophones in detector cable 14. To identify the extent to which receiver statics is introduced into the seismic record along with the seismic reflection signals, the vessel 10 locates the seismic energy source at an offset from the detector cable 14 so that the seismic energy waves from the source travel through refraction paths in the subsurface formations upward through the channel 12 and then intersect the cable 14 from a generally broadside or orthogonal direction. The first refraction arrivals recorded by the hydrophones in the cable 14 are compared to conventionally recorded refraction data from non-low velocity layer areas to determine the receiver statics for the selected exploration site.

Corrections to the recorded seismic reflection data are then carried out by removing the distortions caused by such source and receiver statics introduced by the low velocity sediments in the buried channel at the selected exploration site.

In the above described preferred embodiment, the seismic exploration system, may be of the type described in U.S. Pat. No. 2,590,531 to K. W. McLoad wherein the seismic detector cable is deployed on the ocean bottom from a first marine vessel while the seismic energy source is deployed from a second marine vessel. A suitable seismic energy source for producing repetitive pulses of seismic energy from air guns is described in U.S. Pat. No. 3,687,218 to S. F. Ritter. An on-bottom seismic receiver system that is particularly suitable for use as the remote seismic monitor for refraction measurements is disclosed in U.S. patent application Ser. No. 163,757, filed June 27, 1980, to Bowden et al.

While a particular embodiment of the invention has been shown and described, various modifications may be made to the present invention without departing from the true spirit and scope of the invention as set forth in the appended claims.

I claim:

1. A method for seismic exploration at a marine exploration site having an anomalous near surface low velocity layer below the water bottom, comprising the steps of:

(a) deploying a marine seismic detector cable along a seismic exploration line for which seismic reflection signals traveling to said seismic detector cable pass through a near surface low velocity layer, (d) deploying a marine seismic monitor at a distance remote from said seismic detector cable such that the first energy received at said monitor consists of seismic refraction signals which have passed through said near surface low velocity layer, and (c) generating first seismic energy at an offset distance from said seismic detector cable so as to produce a first seismic signal which travels downward into the earth, is refracted through the earth, and travels upward through said near surface low velocity layer to intersect said seismic detector cable in a generally orthogonal direction, whereby said first seismic signal, as received by said detector cable, includes a receiver statics component attributable to said near surface low velocity layer, (d) generating second seismic energy so as to produce a second seismic signal which travels downward through said near surface low velocity layer into the earth, is (i) refracted through the earth and detected by said remote seismic monitor, said refracted second seismic signal including a source statics component attributable to said near surface low velocity layer and (ii) reflected from the earth and detected by said seismic detector cable at the same time said refracted second seismic signal is detected by said remote seismic monitor.

2. The method of claim 1 wherein said detected first seismic refraction signal from said low velocity layer area is compared to recorded refraction data from non-low velocity layer areas to determine the receiver statics for the selected exploration site.

3. The method of claim 1 wherein said reflected second seismic signal detected by said seismic detector cable is compared to said refracted second seismic signal detected at the same time by said remote seismic monitor to determine the source statics for the selected exploration site.

* * * * *